UNITED STATES PATENT OFFICE.

ERNEST M. GARDNER, OF BROOKLINE, ASSIGNOR TO JAMES L. LITTLE, JR., OF BOSTON, MASSACHUSETTS.

COMPOSITION FOR SECONDARY-BATTERY ELECTRODES.

SPECIFICATION forming part of Letters Patent No. 336,101, dated February 16, 1886.

Application filed May 25, 1885. Serial No. 166,598. (No specimens.)

*To all whom it may concern:*

Be it known that I, ERNEST M. GARDNER, of Brookline, Suffolk county, Massachusetts, have invented a new and useful Improvement in Compositions for Secondary-Battery Electrodes, of which the following is a specification.

My invention relates to an electrode for secondary batteries; and it consists more particularly in a composition of matter from which I may form said electrode wholly or in part. The said composition contains a material active in the storage-battery—such, for example, as lead oxide—a conducting material in comminuted form—such as pulverized or granulated carbon—and an agglomerating or cementing substance inert in the battery and possessing the properties of hardness and strength when set.

In practice I have successfully employed the following composition, here presented as one operative embodiment of my invention, to wit: Equal parts of pulverized carbon and lead oxide (red) are intimately mixed. To three parts of this mixture I add one part of calcined magnesia and mingle. I then add sufficient of the mother-liquor from salt manufacture to form a resulting pasty mass, which mass I mold into shape or pack in cavities or supports adapted to hold it in proper manner to act as an electrode in a secondary cell. When this composition hardens, (and it should be permitted to set or harden before use,) it is exceedingly strong and stone-like, while still sufficiently porous. It resists disintegration and does not buckle, bend, or change form under the influence of battery-fluids.

In place of mother-liquor from salt manufacture, I may use dilute hydrochloric acid; but I find it advantageous to use the mother-liquor from salt manufacture as a moistening material for producing the pasty mass, because it has the advantage of cheapness, and the composition containing it, when set and hardened, is fully as strong and durable as when the dilute hydrochloric acid is used.

I do not limit myself to the exact proportions of ingredients above mentioned, because these may obviously be varied without materially changing the results obtained.

I claim as my invention—

A composition for secondary-battery electrodes, consisting in an active material—such as lead oxide—a conducting material, calcined magnesia, and the mother-liquor from salt manufacture, the said ingredients being mingled and combined to form first a plastic mass and on setting and drying a hard body, substantially as described.

ERNEST M. GARDNER.

Witnesses:
PARK BENJAMIN,
W. E. DORAN.